United States Patent Office 3,559,164
Patented Jan. 26, 1971

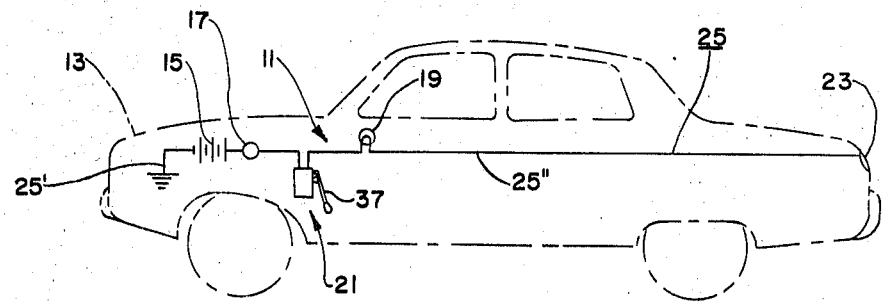
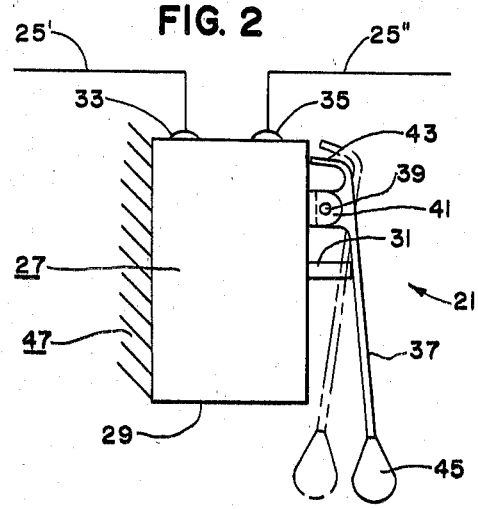
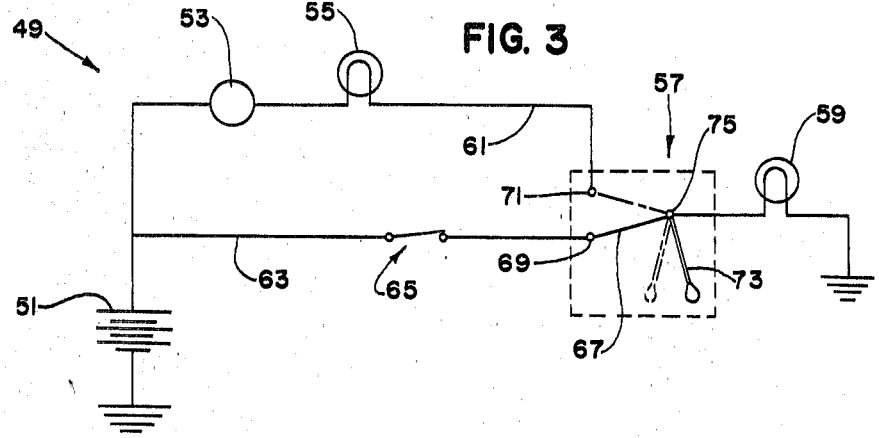

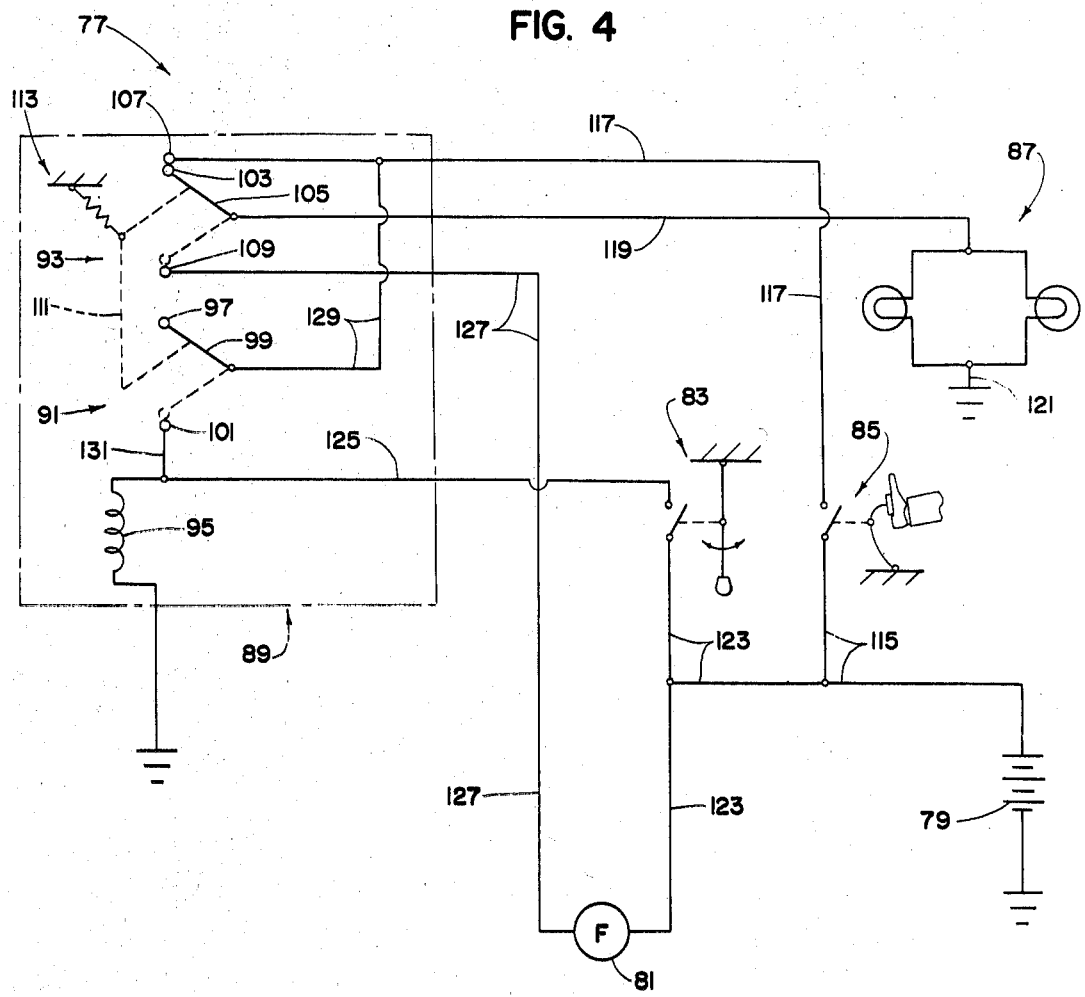

3,559,164
VEHICULAR DECELERATION SAFETY CIRCUIT MEANS
Harold R. Bancroft, 3052 Capri Road, and James Z. Boggan, 3046 Capri Road, both of Memphis, Tenn. 38118
Continuation-in-part of application Ser. No. 726,981, May 6, 1968. This application Oct. 24, 1968, Ser. No. 777,966
Int. Cl. B60q 1/44, 1/46
U.S. Cl. 340—72                          1 Claim

ABSTRACT OF THE DISCLOSURE

Inertia operative warning light and switch means adapted for installation in an automobile or like vehicle including means for producing a flashing light on the rear of the vehicle as that vehicle is being brought to an emergency stop or is being decelerated more rapidly than the deceleration in normal stops of the vehicle. The flashing rear light being adapted to signal the driver of a trailing vehicle that the leading vehicle is decelerating at a rapid rate.

CROSS-REFERENCE TO RELATED APPLICATION

This is a continuation-in-part of application Ser. No. 726,981 filed May 6, 1968, now abandoned.

BACKGROUND OF THE INVENTION

(1) Field of the invention

The invention relates to electrically operative visual signal devices adapted for use on automotive vehicles and particularly to such devices for signalling the driver of a trailing vehicle of an abrupt stop of a leading vehicle; the invention relates to warning devices for preventing a trailing vehicle from running into the rear of a leading vehicle.

(2) Description of the prior art

Rear end collisions in automobile travel or chain reaction collisions in automobile travel is becoming increasingly a problem in traffic safety. High speed driving on expressways or freeways and congested traffic conditions in urban areas have resulted in a significant increase in the number of rear end collisions. In the relatively recent past, a number of devices have been designed for reducing the number or hazard of rear end collisions. Pat. No. 2,474,610 illustrates warning light means adapted for attachment on the rear of an automobile and such light means which signals the driver in a trailing automobile by varying the color or shade of the warning light. A problem with a warning light system such as this is that in persons affected by color blindness the warning system is ineffective. In the prior art another way of warning the driver of a trailing vehicle of rapid deceleration of a leading vehicle is by providing the leading vehicle with a horizontally arranged series of lamps which are adapted to be sequentially energized from right to left or vice versa when the leading vehicle is being rapidly decelerated. Apparatus such as this is illustrated in Pats. No. 3,157,854 and 3,258,746. A more recent Pat. No. 3,332,060 signals rapid deceleration of a vehicle by varying the brakelight intensity. This patent utilizes an inertially operative ball for varying the resistance in a lighting circuit for varying the intensity of a stop light; as the vehicle deceleration rate increases, the stop light intensity increases to give warning that the vehicle is decelerating. An undesirable feature of such warning means is that with the driver of the trailing vehicle there is a slight delay in his response while determining whether or not the lamp is dimming or varying in intensity.

SUMMARY OF THE INVENTION

The flashing light warning means of the present invention produces a signal which is substantially instantaneously recognized as being a warning signal and produces a signal which may be quickly responded to by the driver of the trailing vehicle. It is of substantially simple design and does not require a series of sequentially energized lamps or lamps of different colors. The flashing lamp means of the present invention produces a signal which is substantially universally recognized as being a caution or hazard signal. The deceleration warning apparatus of the present invention utilizes a weighted pendulum actuating a microswitch. The pendulum is adapted to swing forwardly as the vehicle is being rapidly decelerated and to close the microswitch circuit nad energize an electrically operative flashing unit and rear stop lamp. The flashing unit being adapted for rapidly making and breaking the circuit and flashing the warning lamp. The warning lamp apparatus of the invention is relatively simple in design and is substantially easy to install in the lighting system of an automotive vehicle. The apparatus is of durable construction and requires minimum maintenance.

BRIEF DESCRIPTION OF THE DRAWING

FIG. 1 is a schematic illustration of the deceleration safety circuit means of the present invention illustrated as being installed in an automobile (shown in broken lines).

FIG. 2 illustrates the inertia operative switch means of the invention.

FIG. 3 is a modified embodiment of the invention illustrating the safety circuit means arranged in conjunction with the stop light circuit means of an automobile.

FIG. 4 is a schematic illustration of the third embodiment of the invention.

DESCRIPTION OF THE PREFERRED EMBODIMENTS

The deceleration safety circuit means is indicated by numeral 11 and is illustrated in FIG. 1 in conjunction with an automobile indicated 13. Safety circuit means 11 basically includes a battery 15, a flasher unit 17, a monitor lamp 19 arranged on the instrument panel of automobile 11, inertia operative switch means 21, a warning lamp 23 arranged on the rear of the automobile, and electrical conductor means including lead wires indicated 25', 25'' and automotive ground conductor means electrically connecting the above named parts in series. Flasher unit 17 is a typical automotive type flasher unit or any suitable well known flashing means, such as a mechanical flasher, electronic flasher or the like, for automatic movement between open and closed positions respectively for energizing and de-energizing safety circuit means 11. Monitor lamp 19 is arranged within view of the driver of automobile 13 and provides visual indication by flashing light means of the condition of safety circuit means 11. If desired, lamp 19 may be omitted without departing from the spirit and scope of the present invention.

Inertia operative switch means 21 includes a microswitch unit 27 of typical construction including a case 29, a plunger 31 and mechanism arranged within case 29 for making or breaking the circuit of safety circuit means 11 upon actuation of plunger 31; lead wires 25', 25'' and posts 33, 35 of microswitch 27. It will be understood that when plunger 31 is moved inwardly or to the left as viewed in FIG. 2, the switch unit 27 is closed so that electricity may flow between contacts 33, 35 and when the plunger is moved outwardly or to the right, the switch unit will be opened.

Inertia operative switch means 21 includes weighted pendulum means for actuating microswitch plunger 31 inwardly and outwardly relative to case 29. Weighted pendulum means including a lever 37 is fulcrumed at axle 39 by tab members 41 fixed on the upper portion of microswitch case 29. The upper portion 43 of lever 37 is curved inwardly toward case 29 and provides stop means for stopping lever 37 in a normal open circuit disposition (shown in full lines in FIG. 2). A teardrop shaped weight 45 is secured on the lower distal end of lever 37. Mounting structure 47 (shown diagrammatically in section lines in FIG. 2) mounts inertia switch means 21 in automobile 13 with the pendulum being supported on a horizontal pivot axis pivotable forwardly and rearwardly relative to automobile 13.

Pendulum lever 37 is adapted to be arranged in a rearward normal disposition with circuit means 11 being de-energized. When automobile 13 is rapidly decelerating or being brought to an abrupt stop, inertia forces acting through weight 45 causes lever 37 to swing forwardly, close the contacts of switch unit 27 and energize circuit means 11. The energized circuit means through flasher unit 17 energizes monitor lamp 19 and lamp 23 simultaneously and produces a flashing signal by lamp 23 to be observed by the driver of a trailing vehicle. After vehicle 13 has been slowed sufficiently or brought to a stop, lever 37 and weight 45 will return under the influence of gravity, and a plunger return spring, not shown, in microswitch 27, to a rearward position thereby opening circuit means 11 and de-energizing lamp 23.

A second embodiment of the invention indicated by numeral 49 is illustrated in FIG. 3 and includes a battery 51, a flasher unit 53, a monitor lamp 55, inertia operative switch means 57, stop lamp means 59, and conductor means including lead wires 61. Safety circuit means 49 is adapted to be incorporated in an automobile having stop light circuit means 63 including in addition to battery 51 and stop lamp 59, on and off operative stop light switch means 65 adapted to be closed and opened in the usual manner respectively upon depressing or releasing the brake pedal of the automobile.

Inertia operative switch means 57 is a micro type switch means similar to switch means 21 except that instead of the switch unit being an off-on type, it is a single pole-double throw type. It is illustrated diagrammatically in FIG. 3 and includes a contact carrying arm 67 adapted for swinging movement between post members 69, 71 and for closing respectively stop light circuit 63 and safety circuit 49. FIG. 3 illustrates inertia operative switch means 57 arranged with pendulum 73 in a rearward disposition and for normal actuation of stop light circuit 63. With pendulum 73 in a rearward normal disposition in which case arm 67 is disposed between contacts 69, 75 as shown in solid lines in FIG. 3, actuation of the automobile brake pedal to a depressed disposition closes stop light switch 65 and energizes stop lamp 59. When the automobile is rapidly decelerated, pendulum 73 is swung forwardly (shown in broken lines in FIG. 3) and arm 67 is moved to a position between posts 71 and 75. In this condition, flasher unit 53, monitor lamp 55, and stop lamp 59 are simultaneously energized and stop lamp 59 caused to emit flashing beams of light. As the vehicle decelerates, and the deceleration rate reaches a predetermined point, pendulum 73 returns to a rearward position and arm 67 of switch means 57 to a position between posts 69, 75. In this condition stop lamp 59 may again be energized by depressing the automobile brake pedal and closing stop light switch 65. As in the first bodiment described, the monitor lamp 55 may be omitted without departing from the spirit and scope of the present invention.

A third embodiment of the present invention is illustrated in FIG. 4 and indicated by numeral 77. The third embodiment of the invention includes relay switch means adapted for causing the flashing of the rear stop lamp on a vehicle continuously after the inertia operative switch is actuated, as when slowing down, and so long as the operator of the vehicle continues to hold the brake pedal in a depressed disposition even if the vehicle is stopped.

With reference to FIG. 4, embodiment 77 includes a battery 79, flasher switch means 81, inertia-operative switch means 83, foot operative stop lamp switch means 85, stop lamp or warning lamp means 87, and relay switch means 89 including a primary contact set 91, a secondary contact set 93, and electro-magnetic coil means 95 for providing mechanical movement of primary and secondary contact sets 91, 93. Flasher switch 81, inertia switch 83, and warning lamp means 87 are preferably of like structure and function respectively with corresponding parts in the above described first and second embodiments 11 and 49 of the invention; therefore, the following of the specification will define in detail the structure of relay switch means 89 and the conductor means for conducting current to the various components of the embodiment.

Primary contact set 91 of relay switch means 89 is an on and off, make and break type switch having a movable contact 97 mounted on a pivoted arm 99 or other like throw structure. Contact 97 is movable between an open circuit first position (indicated in full lines in FIG. 4) and a closed circuit second position in engagement with fixed contact 101 (shown in broken lines in FIG. 4). Secondary contact set 93 includes a movable contact 103 mounted on a throw arm 105 and is adapted for movement between a first position (shown in full lines) and a second position (shown in broken lines). Movable contact 103 is adapted to be moved to a first position in contacting engagement with a first fixed contact 107, and to a second position in engagement with a second fixed contact 109.

Contact arm means 99, 105 respectively of primary and secondary contact sets 91, 93 are mechanically connected together for simultaneous movement respectively to the first and second positions; connecting means 111 (indicated in broken lines) provide means for connecting, and for the above mentioned simultaneous movement of movable contact arm means 99, 105. Spring means 113 yieldably holds contact throw arms 99, 105 in the first or normal positions (shown in full lines in FIG. 4) with primary contact set 91 in an open circuit disposition and secondary contact set 93 arranged with movable contact 103 engaging fixed contact 107.

Electro-magnetic force means of coil 95 preferably is utilized directly through air gap spacing between the coil and structure of contact arms 99, 105. In certain embodiments, however, it may be desirable to utilize solenoid operative type electro-magnetic coil and armature means for shiftably moving contact arms 99, 105 without departing from the spirit and scope of the invention. Coil 95, when energized, causes contact arms 99, 105 to be moved against the tension of spring means 113; when energized, coil 95 causes primary contact set 91 to be arranged in a closed circuit disposition and secondary contact set 93 to be arranged with movable contact 103 engaging fixed contact 107.

First conductor means including conductors 115, 117, 119, 121 connect in series foot operative stop light switch 85, movable and fixed contacts 103, 107 of secondary contact set 93 (when in said first position), and lamp means 87. Second conductor means including conductors 115, 123, 125 connect in series, inertia-operative switch means 83 and coil 95 of relay switch 89. Third conductor means including conductors 115, 123, 127, 119 and 121 connect in series flasher switch 81 and lamp means 87. Fourth conductor means including conductors 115, 117, 129, 131 connect in series foot operative switch means 85, and coil 95 when primary and secondary contact sets 91, 93 are arranged in said second positions (indicated in broken lines).

The operation of third embodiment 77 is described hereinafter by describing the somewhat sequential conditions existing as an automobile is rapidly decelerated or braked to a stopped disposition: When the operator of the automobile first depresses the brake pedal and closes switch 85, a circuit of said first conductor means 115, 117, 119, 121 is established, causing current to flow through movable and fixed contacts 103, 107 of secondary contact set 93, and causes lamps 87 to burn with a steady light. As the deceleration rate of the automobile progressively increases or almost immediately when there is a quick stop, inertia-operative switch 83 closes causing current to flow through said second conductor means 115, 123, 125 thereby energizing coil 95 and simultaneously moving primary and secondary contact sets to said second positions (indicated in broken lines). Simultaneous movement of contact arms 99, 105 to said second positions establish substantially simultaneously two current paths; secondary contact set movable contact 103 is shifted from fixed contact 107 to fixed contact 109 and through said third conductor means 115, 123, 127, 119, 121 establishes a flow of current through flasher switch 81 and warning lamp 87 and causes the lamp to flash intermittently; a second path of electricity is established by closing primary contact set 91 which causes current to flow through fourth conductor means 115, 117, 129, 131, and with both switch means 83, 85 in closed dispositions establishes generally parallel or shunt circuitry with current flowing through conductor means 115, 123, 127, 119, 121. As the automobile is brought to a halted disposition, inertia-operative switch 83 will be inoperative but current flowing through stop lamp switch 85, flasher unit 81 and conductor means 115, 119, 121, 123, 127 will cause lamp means 87 to continue intermittent flashing. Primary contact set 91, being in a closed disposition, energizes coil 95 and holds movable contact arms 99, 105 in said second positions (broken line position) until the operator releases the brake pedal and opens stop lamp switch 85. Primary contact set 91 in conjunction with coil means 95 functions somewhat as a selfenergizing switch means for holding secondary contact set 93 in a second disposition for energizing the flashing lamp circuit means of the apparatus.

We claim:

1. Deceleration safety circuit means for an automobile or like vehicle comprising a battery, stop lamp means, flasher switch means, foot operative stop lamp switch means, inertia-operative switch means having weight means arranged for movement between an open circuit first position and a closed circuit second position, means mounting said inertia-operative switch means in said vehicle with said weight being movable rearwardly and forwardly respectively towards said first and second positions, said weight means normally arranged rearwardly in said open circuit disposition and movable forwardly under inertial forces to said closed circuit disposition upon deceleration or braking of the vehicle, relay switch means including primary and secondary contact sets each including fixed and movable contacts, and including electro-magnetic coil means for movement of said movable contacts simultaneously each between first and second positions, said primary contact set being an on and off type switch having a fixed contact and a movable contact, said secondary contact set having a movable contact and first and second fixed contacts, spring means urging said movable contacts simultaneously to said first positions wherein said primary contact set is in an open circuit disposition and said secondary contact set is arranged with said movable contact engaging said first fixed contact, said movable contacts being moved to said second positions upon energizing of said electro-magnetic coil means thereby respectively closing the circuit of said primary contact set by contacting said fixed and movable contacts thereof and thereby moving said movable contact of said secondary contact set into contacting engagement with said second fixed contact; first conductor means including means connecting in series said foot operative stop lamp switch means, said movable contact and first fixed contact of said relay switch means secondary contact set, and said stop lamp means when said movable contact of said secondary contact set is in said first position; second conductor means including means connecting in series said inertia-operative switch means and said coil means of said relay switch means; third conductor means including means connecting in series said stop lamp means, said flasher switch means, and said movable contact and second fixed contact of said relay switch means secondary contact set when said movable contact of said secondary contact set is in said second position; and fourth conductor means including means connecting in series said movable contact and said fixed contact of said primary contact set, said foot operative stop lamp switch means and said coil means of said relay switch means when said movable contacts are in said second positions.

References Cited

UNITED STATES PATENTS

| | | | |
|---|---|---|---|
| 2,474,610 | 6/1949 | Wunsch | 340—262 |
| 2,929,919 | 3/1960 | Schwenkler | 200—61.48X |
| 2,986,615 | 5/1961 | Hardway | 200—61.45 |
| 3,073,922 | 1/1963 | Miller | 340—262X |
| 3,089,129 | 5/1963 | Nassikas et al. | 340—262 |
| 3,434,106 | 3/1969 | Lawless | 340—262X |

FOREIGN PATENTS

| | | | |
|---|---|---|---|
| 1,026,181 | 3/1958 | Germany | 340—262 |

THOMAS B. HABECKER, Primary Examiner

K. N. LEIMER, Assistant Examiner